United States Patent
Greenblatt et al.

(10) Patent No.: US 12,250,316 B2
(45) Date of Patent: Mar. 11, 2025

(54) METHODS AND SYSTEMS FOR SELECTING AN OPTIMAL PROOF SYSTEM FOR ZERO-KNOWLEDGE AND OTHER PROOFS

(71) Applicant: IronMill, Inc., Redwood City, CA (US)

(72) Inventors: Aaron B. Greenblatt, Redwood City, CA (US); Francesca Scire-Scappuzzo, Lexington, MA (US); Soham Bhattacharya, San Jose, CA (US); Sahil Mahendrakar, Nashua, NH (US); Saloni Gupta, Cupertino, CA (US)

(73) Assignee: Turbo Protocol, Inc., Palo Alto, CA (US)

( * ) Notice: Subject to any disclaimer, the term of this patent is extended or adjusted under 35 U.S.C. 154(b) by 238 days.

(21) Appl. No.: 18/172,748

(22) Filed: Feb. 22, 2023

(65) Prior Publication Data
US 2023/0269083 A1 Aug. 24, 2023

Related U.S. Application Data

(60) Provisional application No. 63/313,533, filed on Feb. 24, 2022.

(51) Int. Cl.
*H04L 9/32* (2006.01)
*H04L 9/00* (2022.01)

(52) U.S. Cl.
CPC ............ *H04L 9/3221* (2013.01); *H04L 9/008* (2013.01)

(58) Field of Classification Search
CPC ..... H04L 9/008; H04L 9/3221; H04L 9/3218; H04L 9/3239; H04L 9/50
See application file for complete search history.

(56) References Cited

U.S. PATENT DOCUMENTS

| | | | |
|---|---|---|---|
| 7,353,396 B2 * | 4/2008 | Micali | G07F 7/1016 713/176 |
| 11,080,412 B1 * | 8/2021 | Moore | G06F 21/604 |
| 11,245,528 B1 * | 2/2022 | Greco | H04L 9/3213 |
| 2020/0076602 A1 * | 3/2020 | Redpath | H04L 9/0643 |
| 2020/0076615 A1 * | 3/2020 | Redpath | H04L 9/3252 |
| 2021/0144006 A1 * | 5/2021 | Ma | H04L 9/0643 |
| 2022/0239489 A1 * | 7/2022 | Maruyama | H04L 9/3221 |
| 2023/0269083 A1 * | 8/2023 | Greenblatt | H04L 9/3221 713/168 |
| 2024/0129126 A1 * | 4/2024 | Baeza-Yates | H04L 9/3221 |

OTHER PUBLICATIONS

"Avalanche Platform", Avalanche Dev Docs, Available online at: https://docs.avax.network/overview/getting-started/avalanche-platform, Accessed from Internet on Mar. 24, 2023, 2 pages.

(Continued)

*Primary Examiner* — Gary S Gracia
(74) *Attorney, Agent, or Firm* — Mark P. Mathison

(57) ABSTRACT

Methods and systems are presented for generating a zero-knowledge, or other, proof for a prover (user) in need of specialized services for generating a zero-knowledge proof. The prover transmits a proof request comprising a witness and a statement to an orchestrator. The orchestrator determines an optimal zero-knowledge proof system for the particular statement and witness. It then transmits the proof request to a prover network with the optimal proof system to generate a zero-knowledge proof in an efficient manner. The proof is then transmitted back to the orchestrator and/or published or otherwise made available.

20 Claims, 9 Drawing Sheets

(56) References Cited

OTHER PUBLICATIONS

"Awesome—a Curated List of Amazing Homomorphic Encryption Libraries, Software and Resources", Available online at: https://github.com/jonaschn/awesome-he, Accessed from Internet on Mar. 24, 2023, pp. 1-6.
"AWS Lambda Run Code Without Thinking About Servers or Clusters", Serverless Computing—AWS Lambda —Amazon Web Services, Available online at: https://aws.amazon.com/lambda/, Accessed from Internet on Mar. 24, 2023, pp. 1-8.
"Bridging the Governance Gap: Interoperability for Blockchain and Legacy Systems", Centre for the Fourth Industrial Revolution, Dec. 2020, 40 pages.
"Decentralized Social Networking Protocol (DSNP)", Project Liberty, Available Online at: dsnp@projectliberty.io www.projectliberty.io, Oct. 2020, 26 pages.
"ERC-20 Token Standard", Available online at: https://ethereum.org/en/developers/docs/standards/tokens/erc-20/, Jan. 20, 2023, 6 pages.
"Ethereum Name Service", Available online at: https://ens.domains/, Accessed from Internet on Mar. 25, 2023, 7 pages.
"Facebook Building Own Fiber Network to Link Data Centers", Data Center Knowledge, News and Analysis for the Data Center Industry, May 24, 2017, pp. 1-5.
"From AIRs to RAPs—How PLONK-style Arithmetization Works", Available online at: https://hackmd.io/@aztec-network/plonk-arithmetiization-air, May 2021, pp. 1-8.
"Groth16", Available online at: https://www.zeroknowledgeblog.com/index.php/groth 16, 2016, 5 pages.
"Hardware Acceleration for Zero Knowledge Proofs", Paradigm, Apr. 13, 2022, pp. 1-7.
"How Do Trusted Setups Work?", Available online at: https://vitalik.ca/general/2022/03/14/trustedsetup.html, Mar. 14, 2022, pp. 1-7.
"ITP499—Blockchain", Information Technology Program, Units: 3, 2017, pp. 1-7.
"Kubernetes", Available online at: https://kubernetes.io, Accessed from Internet on Mar. 24, 2023, 6 pages.
"Plonky2: Fast Recursive Arguments with PLONK and FRI", Polygon Zero Team, Sep. 7, 2022, 16 pages.
"Practical Secure Computation", Available online at: https://securecomputation.org/projects.html, Accessed from Internet on Mar. 24, 2023, pp. 1-2.
"Productionizing and Scaling Python ML Workloads Simply", Ray, Available Online at: https://www.ray.io/, Accessed from Internet on Mar. 25, 2023, 7 pages.
"Render Token (RNDR) Whitepaper", Available online at: https://www.securities.io/render-whitepaper/, Aug. 28, 2017, 10 pages.
"The Sui Smart Contracts Platform", The MystenLabs Team, Available Online at: hello@mystenlabs.com, Mar. 22, 2022, 11 pages.
"TPM 2.0 Library", Trusted Computing Group, Available online at: https://trustedcomputinggroup.org/resource/tpm-library-specification/, Accessed from Internet on Mar. 25, 2023, 11 pages.
"Zero Knowledge Proof—FPGA or GPU?", Trapdoor-Tech, Available online at: https://trapdoortech.medium.com/zero-knowledge-proof-fpga-or-gpu-97b96ffbf0f, Sep. 7, 2022, pp. 1-13.
"ZK Whiteboard Sessions", Available online at: https://zkhack.dev/whiteboard/, Accessed from Internet on Mar. 25, 2023, pp. 1-7.
Abadi et al., "Deep Learning with Differential Privacy", CCS '16: Proceedings of the 2016 ACM SIGSAC Conference on Computer and Communications Security, Oct. 24, 2016, 14 pages.
Adler et al., "Astraea: a Decentralized Blockchain Oracle", 2018 IEEE International Conference on Internet of Things (iThings) and IEEE Green Computing and Communications (GreenCom) and IEEE Cyber, Physical and Social Computing (CPSCom) and IEEE Smart Data (SmartData), Aug. 1, 2018, 8 pages.
Al-Bassam, "LazyLedger: A Distributed Data Availability Ledger With Client-Side Smart Contracts", Department of Computer Science, Jun. 8, 2019, 15 pages.
Alqahtani, "Snowflake to Avalanche: a Novel Metastable Consensus Protocol Family for Cryptocurrencies", Available online at: t-rocket@protonmail.com, May 16, 2018, 21 pages.
Anderson et al., "SETI@home an Experiment in Public-Resource Computing", Communications of the ACM, vol. 45, No. 11, Nov. 2002, pp. 56-61.
Androulaki et al., "Hyperledger Fabric: A Distributed Operating System for Permissioned Blockchains", EuroSys '18: Proceedings of the Thirteenth EuroSys Conference, Apr. 23-26, 2018, 15 pages.
Asanović et al., "Instruction Sets Should Be Free: The Case For RISC-V", Technical Report No. UCB/EECS-2014-146, Electrical Engineering and Computer Sciences, Aug. 6, 2014, 7 pages.
Babai et al., "Checking Computations in Polylogarithmic Time", STOC '91: Proceedings of the twenty-third annual ACM symposium on Theory of Computing, Jan. 1991, pp. 21-31.
Backus, "Minimum Viable Decentralization", The Wayback Machine, Available online at: https://web.archive.org/web/20191127141547/https://medium.com/@jbackus/minimum, Jul. 27, 2018, pp. 1-9.
Benarroch et al., "Community Proposal: A Benchmarking Framework for (Zero-Knowledge) Proof Systems", Available online at: https://docs.zkproof.org/pages/standards/accepted-workshop3/proposal-benchmarking.pdf, Apr. 9, 2020, 22 pages.
Benet, "IPFS—Content Addressed, Versioned, P2P File System", Available online at: https://arxiv.org/pdf/1407.3561.pdf, Jul. 14, 2014, 11 pages.
Benhamouda et al., "Supporting Private Data on Hyperledger Fabric with Secure Multiparty Computation", 2018 IEEE International Conference on Cloud Engineering (IC2E), Apr. 17-20, 2018, 8 pages.
Bitansky et al., "From Extractable Collision Resistance to Succinct Non-Interactive Arguments of Knowledge, and Back Again", ITCS '12: Proceedings of the 3rd Innovations in Theoretical Computer Science Conference, Nov. 30, 2011, 51 pages.
Bogdanov et al., "Sharemind: a Framework for Fast Privacy-preserving Computations", Conference: Computer Security—ESORICS 2008, 13th European Symposium on Research in Computer Security, Oct. 2008, 23 pages.
Bowe et al., "Recursive Proof Composition without a Trusted Setup", Electric Coin Company, Sep. 11, 2019, 31 pages.
Brakerski, "Fully Homomorphic Encryption without Modulus Switching from Classical GapSVP", Proceedings of the 32nd Annual Cryptology Conference on Advances in Cryptology—CRYPTO 2012, Aug. 2012, 20 pages.
Breidenbach et al., "Chainlink 2.0: Next Steps In The Evolution Of Decentralized Oracle Networks", v1.0, Apr. 15, 2021, 136 pages.
Buterin, "Exploring Elliptic Curve Pairings", Available online at: https://medium.com/@VitalikButerin/exploring-elliptic-curve-pairings-c73c1864e627, Jan. 16, 2017, pp. 1-11.
Buterin, "Quadratic Arithmetic Programs: from Zero to Hero", Available online at: https://medium.com/@VitalikButerin/quadratic-arithmetic-programs-from-zero-to-hero-f6d558cea649, Dec. 12, 2016, pp. 1-15.
Buterin, "ZK-SNARKs: Under the Hood", Available online at: https://medium.com/@VitalikButerin/zk-snarks-under-the-hood-b33151a013f6, Feb. 3, 2017, pp. 1-8.
Cai et al., "A Truth-Inducing Sybil Resistant Decentralized Blockchain Oracle", 2020 2nd Conference on Blockchain Research & Applications for Innovative Networks and Services (BRAINS), Sep. 28-30, 2020, 8 pages.
Canetti et al., "Adaptively Secure Multi-Party Computation", STOC '96: Proceedings of the twenty-eighth annual ACM symposium on Theory of Computing, Jul. 1, 1996, pp. 639-648.
Chen et al., "A Review of zk-SNARKs", Cryptography and Security, May 16, 2022, 34 pages.
Cheon et al., "Homomorphic Encryption for Arithmetic of Approximate Numbers", International Conference on the Theory and Application of Cryptology and Information Security, Nov. 30, 2017, 23 pages.
Damgard et al., "Multiparty Computation from Somewhat Homomorphic Encryption", International Association for Cryptologic Research, Aug. 19, 2012, 46 pages.

(56) References Cited

OTHER PUBLICATIONS

Demmler et al., "ABY—A Framework for Efficient Mixed-Protocol Secure Two-Party Computation", Conference: Network and Distributed System Security Symposium, Feb. 7, 2015, 15 pages.
Ellis et al., "ChainLink—A Decentralized Oracle Network", v1.0, Sep. 4, 2017, 38 pages.
Fan et al., "Somewhat Practical Fully Homomorphic Encryption", Computer Science, Mathematics, Mar. 22, 2012, 19 pages.
Franz et al., "CBMC-GC: An ANSI C Compiler for Secure Two-Party Computations", International Conference on Compiler Construction, Apr. 2014, 5 pages.
Gabizon et al., "PlonK: Permutations over Lagrange-bases for Oecumenical Noninteractive arguments of Knowledge", Available online at: https://ia.cr/2019/953, Aug. 17, 2022, 34 pages.
Gong et al., "Analysis and Comparison of the Main Zero-knowledge Proof Scheme", 2022 International Conference on Big Data, Information and Computer Network (BDICN), Jan. 20-22, 2022, pp. 366-372.
Groth, "On the Size of Pairing-based Non-interactive Arguments", Annual International Conference on the Theory and Applications of Cryptographic Techniques, Apr. 28, 2016, 25 pages.
Hastings et al., "SoK: General Purpose Compilers for Secure Multi-Party Computation", 2019 IEEE Symposium on Security and Privacy (SP), May 19-23, 2019, 18 pages.
Hopwood et al., "Zcash Protocol Specification", Version 2022.3.8 [NU5], Sep. 15, 2022, 221 pages.
Jette et al., "SLURM: Simple Linux Utility for Resource Management", Conference: SLURM: Simplex Linux Utility for Resource Management, Jun. 23, 2003, 27 pages.
Johnson et al., "The Elliptic Curve Digital Signature Algorithm (ECDSA)", International Journal of Information Security, Aug. 23, 1999, 55 pages.
Kairouz et al., "Advances and Open Problems in Federated Learning", Foundations and Trends in Machine Learning, vol. 4, No. 1, Mar. 9, 2021, 76 pages.
Kalodner et al., "Arbitrum: Scalable, Private Smart Contracts", Open access to the Proceedings of the 27th USENIX Security Symposium is sponsored by USENIX, Aug. 15-17, 2018, pp. 1353-1370.
Kim et al., "Flipping Bits in Memory Without Accessing Them: An Experimental Study of DRAM Disturbance Errors", 2014 ACM/IEEE 41st International Symposium on Computer Architecture (ISCA), Jun. 2014, pp. 1-12.
Konstantopoulos, "How Does Optimism's Rollup Really Work", Paradigm Research, Jan. 29, 2021, pp. 1-20.
Kosba et al., "Hawk: The Blockchain Model of Cryptography and Privacy-Preserving Smart Contracts", 2016 IEEE Symposium on Security and Privacy, Sep. 7, 2018, 31 pages.
Lee et al., "Practical Verifiable Computation by Using a Hardware-Based Correct Execution Environment", IEEE Access, vol. 20, Nov. 30, 2020, p. 216689-216706.
Liang et al., "When HTTPS Meets CDN: A Case of Authentication in Delegated Service", IEEE Symposium on Security and Privacy, Available online at: https://www.ieee-security.org/TC/SP2014/papers/WhenHTTPSMeetsCDN_c_ACaseofAuthenticationinDelegatedService.pdf, May 2014, pp. 67-82.
Liu et al., "ObliVM: A Programming Framework for Secure Computation", 2015 IEEE Symposium on Security and Privacy, Jul. 17, 2015, pp. 359-376.
Lopez-Alt et al., "On-the-Fly Multiparty Computation on the Cloud via Multikey Fully Homomorphic Encryption", STOC '12: Proceedings of the forty-fourth annual ACM symposium on Theory of computing, May 2012, 73 pages.
Lu et al., "HoneyBadgerMPC and AsynchroMix: Practical Asynchronous MPC and its Application to Anonymous Communication", CCS '19: Proceedings of the 2019 ACM SIGSAC Conference on Computer and Communications Security, Nov. 11-15, 2019, pp. 887-903.
Marin, "Nexus: A Next-Generation Decentralized Oracle Network and Extended Smart Contract Platform", Available Online at: https://uploads-ssl.webflow.com/623ab3aba271ea70267a3162/625507683e8e423a2f256853_Nexus-Whitepaper.pdf, Apr. 4, 2022, 17 pages.
Matlala et al., "Setup Ceremonies", In the Art of Zero Knowledge, Jun. 30, 2021, 17 pages.
Matney et al., "Ex-meta Employees Raise $200m From A16z, Tiger, Multicoin to Realize Facebook's Crypto Dreams", Techcrunch, Mar. 15, 2022, 9 pages.
Maymounkov et al., "Kademlia: A Peer-to-Peer Information System Based on the XOR Metric", International Workshop on Peer-to-Peer Systems, Oct. 10, 2002, pp. 53-65.
Mofrad et al., "A Comparison Study of Intel SGX and AMD Memory Encryption Technology", Association for Computing Machinery, Available online at: https://doi.org/10.1145/3214292.3214301, Jun. 2, 2018, 8 pages.
Mood et al., "Frigate: A Validated, Extensible, and Efficient Compiler and Interpreter for Secure Computation", 2016 IEEE European Symposium on Security and Privacy (EuroS&P), Mar. 21-24, 2016, 16 pages.
Movahedi et al., "Privacy-Preserving Randomized Controlled Trials: A Protocol for Industry Scale Deployment", CCSW '21: Proceedings of the 2021 on Cloud Computing Security Workshop, Aug. 11, 2021, 13 pages.
Nakamoto, "Bitcoin: A Peer-to-Peer Electronic Cash System", Available online at: https://www.microstrategy.com/en/bitcoin/documents/bitcoin-a-peer-to-peer-electronic-cash-system, Oct. 31, 2008, pp. 1-9.
Nakamura et al., "A Privacy-preserving Outsourcing Scheme for Zero-knowledge Proof Generation", Journal of Information Processing, vol. 30, Feb. 2022, pp. 151-154.
Parno et al., "Pinocchio: Nearly Practical Verifiable Computation", Communications of the ACM, vol. 59, No. 2, May 19-22, 2013, 16 pages.
Poelstra et al., "Confidential Assets", International Conference on Financial Cryptography and Data Security, Feb. 10, 2019, 21 pages.
Raj et al., "fTPM: A Firmware-based TPM 2.0 Implementation", Microsoft Research, Nov. 9, 2015, 23 pages.
Rastogi, "WYSTERIA: A Programming Language for Generic, Mixed-Mode Multiparty Computations", 2014 IEEE Symposium on Security and Privacy, Nov. 2014, 42 pages.
Reitwiebner, "zkSNARKs in a Nutshell", Aug. 24, 2018, 15 pages.
Rekhter et al., "A Border Gateway Protocol 4 (BGP-4)", Network Working Group, Category: Standards Track, rfc4271, Jan. 2006, 104 pages.
Russinovich et al., "CCF: A Framework for Building Confidential Verifiable Replicated Services", Microsoft Research & Microsoft Azure, Apr. 2019, 17 pages.
Sardar et al., "Towards Formalization of Enhanced Privacy ID (EPID)-Based Remote Attestation in Intel SGX", 23rd Euromicro Conference on Digital System Design (DSD), Apr. 2020, 5 pages.
Sasson et al., "Scalable, Transparent, and Post-quantum Secure Computational Integrity", Available online at: https://eprint.iacr.org/2018/046.pdf, Mar. 6, 2018, 83 pages.
Schoenmakers et al., "Trinocchio: Privacy-Preserving Outsourcing by Distributed Veri able Computation", International Conference on Applied Cryptography and Network Security, Jun. 9, 2016, 33 pages.
Schuster et al., "VC3: Trustworthy Data Analytics in the Cloud Using SGX", 2015 IEEE Symposium on Security and Privacy, May 17-21, 2015, pp. 38-54.
Shamis et al., "IA-CCF: Individual Accountability for Permissioned Ledgers", USENIX Association, 19th USENIX Symposium on Networked Systems Design and Implementation, Apr. 4-6, 2022, pp. 466-491.
Songhori et al., "TinyGarble: Highly Compressed and Scalable Sequential Garbled Circuits", 2015 IEEE Symposium on Security and Privacy, May 17-21, 2015, pp. 411-428.
Tal et al., "The Graph: A Decentralized Query Protocol for Blockchains", International Conference on Inventive Research in Computing Applications, Mar. 21, 2018, 12 pages.
Tramer et al., "Slalom: Fast, Verifiable and Private Execution of Neural Networks in Trusted Hardware", Published as a conference paper at ICLR 2019, Feb. 27, 2019, 19 pages.

(56) References Cited

OTHER PUBLICATIONS

Wagstaff et al., "Subspace: A Solution to the Farmer's Dilemma", Available online at: https://assets.website-files.com/61526a2af87a54e565b0ae92/617759c00edd0e3bd279aa29_Subspace_%20A%20solution%20to%20the%20farmer%27s%20dilemma.pdf, Mar. 2019, 11 pages.

Wen et al., "Learning Structured Sparsity in Deep Neural Networks", 30th Conference on Neural Information Processing Systems, Aug. 12, 2016, 9 pages.

Wiggers, "OpenAI's massive GPT-3 model is impressive, but size isn't everything", VentureBeat, Available online at: https://venturebeat.com/ai/ai-machine-learning-openai-gpt-3-size-isnt-everything/, Jun. 1, 2020, 6 pages.

Winter et al., "Madaline Rule 11: A Training Algorithm for Neural Networks", International Conference on Neural Networks, Jul. 24-27, 1988, pp. 1-401-1-408.

Wood, "Ethereum: A Secure Decentralised Generalised Transaction Ledger", EIP-150 Revision, Sep. 30, 2017, pp. 1-34.

Yakovenko, "Solana: a New Architecture for a High Performance Blockchain V0.8.13", Available online at: anatoly@solana.io, Nov. 20, 2020, 32 pages.

Yeluri et al., "Trusted Docker Containers and Trusted VMs in OpenStack", Intel, Jun. 30, 2022, 16 pages.

Yin et al., "HotStuff: BFT Consensus with Linearity and Responsiveness", PODC '19: Proceedings of the 2019 ACM Symposium on Principles of Distributed Computing, Jul. 29-Aug. 2, 2019, pp. 347-356.

Zaharia et al., "Spark: Cluster Computing with Working Sets", HotCloud'10: Proceedings of the 2nd USENIX conference on Hot topics in cloud computing, Jun. 22, 2010, 7 pages.

Zahur et al., "Obliv-C: A Language for Extensible Data-Oblivious Computation", Available online at: https://ia.cr/2015/1153, Nov. 30, 2015, 20 pages.

Zhang et al., "DECO: Liberating Web Data Using Decentralized Oracles for TLS", CCS '20, Virtual Event, USA, Session 6D: Web Security, Nov. 9-13, 2020, pp. 1919-1938.

Zhang et al., "PICCO: A General-Purpose Compiler for Private Distributed Computation", CCS '13: Proceedings of the 2013 ACM SIGSAC Conference on Computer & Communications Security, Nov. 4, 2013, pp. 813-825.

Zhang et al., "PipeZK: Accelerating Zero-Knowledge Proof with a Pipelined Architecture", 2021 ACM/IEEE 48th Annual International Symposium on Computer Architecture (ISCA), Jun. 14-18, 2021, 12 pages.

Zyskind et al., "Decentralizing Privacy: Using Blockchain to Protect Personal Data", 2015 IEEE Security and Privacy Workshops, May 21-22, 2015, pp. 180-184.

Zyskind et al., "Enigma: Decentralized Computation Platform with Guaranteed Privacy", Cryptography and Security (cs.CR), Jun. 10, 2015, 14 pages.

* cited by examiner

METHODS AND SYSTEMS FOR SELECTING AN OPTIMAL PROOF SYSTEM FOR ZERO-KNOWLEDGE AND OTHER PROOFS

CROSS-REFERENCES TO RELATED APPLICATIONS

This application claims the benefit of U.S. Provisional Application No. 63/313,533, filed Feb. 24, 2022, which is herein incorporated by reference in its entirety for all purposes.

BACKGROUND

A zero-knowledge proof can provide a strong guarantee that a statement is true without exposing the information used in creating it. For example, the zero-knowledge proof can be used to prove a person's identity without revealing any private information of the person (e.g., social security number, address, birthday, etc.). Another example can be proving that a person is of age to purchase an alcoholic beverage without actually revealing the age of the person. This and other advantages of using zero-knowledge proofs have led to its increasing usage.

However, generating a zero-knowledge proof is a heavy computational task that requires high computational power and resources (e.g., memory). Unless provided with an advanced computing machine that can computationally handle generating the zero-knowledge proof, creating the zero-knowledge proof can be very difficult. Additionally, generating the zero-knowledge proof can be inefficient even with enough computing power if not assigned to correct computing powers and inefficient proof generation technique.

There is a need in the art for improving zero-knowledge proof generation while keeping it practical for common applications.

SUMMARY

Generally, a user with a need for a zero-knowledge proof of a statement is given a platform (e.g., an orchestrator) that determines an optimal prover computer network (e.g., computer systems) that can generate the zero-knowledge proof efficiently. To determine the optimal prover computer network, the platform can determine an optimal proof system, such as a rank-1 constraint system (R1CS), given the statement, a witness, and user-specified parameters by computing an amount of memory required for the potential proof or computational requirements. The platform can then determine the optimal prover computer network using an optimization algorithm. The optimal prover computer network can then generate a proof efficiently given the statement, the witness, and the optimal proof system. The proof can then be transmitted back to the user or otherwise made available.

Some embodiments of the presently claimed invention relate to a method of generating a zero-knowledge proof. The method includes receiving a request for a proof of a statement, the request comprising the statement, a witness, and a user-specified parameter. The method can then analyze, for each candidate proof system of a plurality of candidate proof systems, the statement and the witness to determine an amount of memory required for a potential proof. It evaluates, for each candidate proof system of the plurality of candidate proof systems, the statement and the witness to determine a computational requirement for the potential proof. The method can select a selected proof system from the candidate proof systems based on the analysis and evaluation, the potential proof from the selected proof system satisfying the user-specified parameter. The statement and the witness are transmitted to a prover computer network that executes the selected proof system. The orchestrator can then receive the proof of the statement from the prover computer network and make the proof available to a client computer.

The candidate proof systems can include a zero succinct non-interactive argument of knowledge (SNARK) proof system and a scalable transparent argument of knowledge (STARK) proof system. The method can include ascertaining from the statement and the witness that generating the potential proof in any proof system of the candidate proof systems would require computing sequential and different tasks, for which the SNARK proof system may be selected. The SNARK proof systems can include a rank-1 constraint system (R1CS) proof system and a permutations over Lagrange-bases for oecumenical noninteractive arguments of knowledge (PLONK) proof system. The method can include ascertaining from the statement and the witness that generating the potential proof in any proof system of the candidate proof systems would require computing repetitive and parallel tasks including recursion, for which the STARK proof system may be selected. The STARK proof system can employ an arithmetic intermediate representation (AIR) step.

The user-specified parameter can include a user-specified do-not-exceed amount of memory for the proof, and/or the user-specified parameter can include a user specified lowest computational requirement.

The amount of memory required for the proof for each candidate proof system can be determined by inputting the statement, the witness, and an attribute for each proof system into a first predictive function.

The method can further include detecting an amount of load that candidate prover computer networks are handling and selecting the prover computer network from among the candidate prover computer networks based on the detecting. The prover computer network can comprise a graphics processing unit (GPU), a field-programmable gate array (FPGA), an application-specific integrated circuit (ASIC), a central processing unit (CPU), or any combination thereof.

The method can further include encrypting the witness through a homomorphic encryption. It can include determining that the statement can be broken into chunks that can be processed in parallel and dividing the statement into the chunks before the transmitting.

The method can include compiling, by the prover computer network, the statement into an arithmetic circuit, and converting the arithmetic circuit into a series of polynomial constraints. It can include sending, by the prover computer network, the arithmetic circuit to a trusted setup, wherein the trusted setup generates a randomness.

The method can include storing the statement and the proof in a blockchain, in a decentralized storage network, or on a centralized cloud storage Tangible media that store the above-referenced instructions for execution on a computer, and computing systems that execute the method, are also envisioned.

A better understanding of the nature and advantages of embodiments of the invention may be gained with reference to the following detailed description and accompanying drawings.

DETAILED DESCRIPTION

Figure 1:
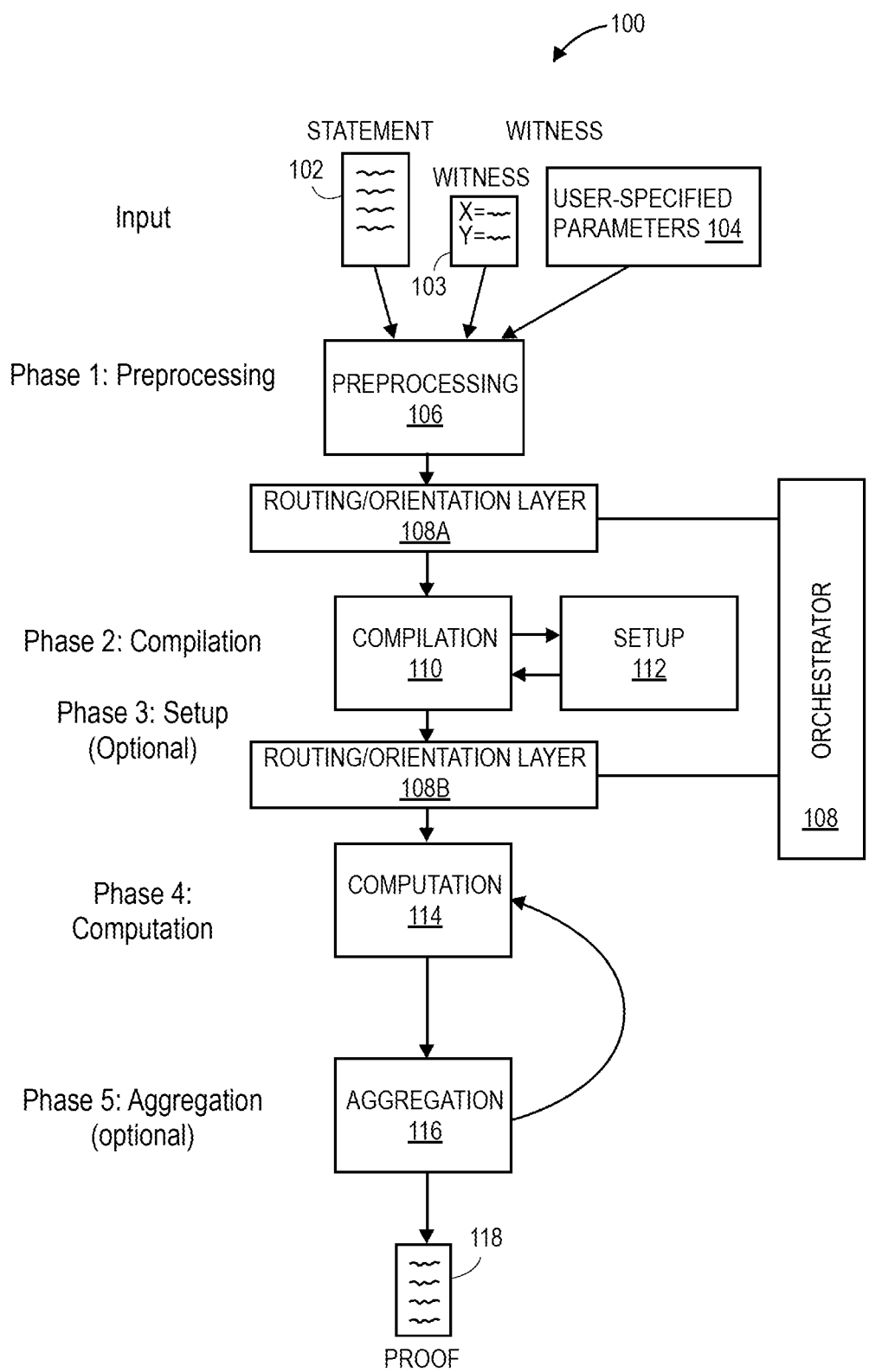
FIG. 1 shows a flow diagram of generating a zero-knowledge proof according to some embodiments.

Prior to discussing embodiments of the disclosure, some terms can be described in further detail.

A "user" may include an individual, a team of individual, another computer, or as otherwise known in the art. In some embodiments, a user may be associated with one or more user devices.

A "decentralized storage network" can be a network storage configuration where there are multiple authorities serving as a centralized hub for users. The decentralized storage network can distribute data among several machines instead of relying on a single central server. One example of the decentralized storage network can be a decentralized blockchain. Other specific examples can include systems such as InterPlanetary File System (IPFS), Filecoin, or as otherwise known in the art.

A "centralized storage," "cloud storage," or "centralized cloud storage" can store and maintain data in a single location as one central unit. It can enable data distribution to be simple from one chief unit to different units for different purposes. Examples can include Amazon Web Services/S3, Microsoft Azure Cloud, Oracle Cloud system, or similar 3rd party storage, or as otherwise known in the art.

A "zero knowledge proof" is a method by which one party (a prover) can prove to another party (a verifier) that something is true without revealing any information apart from the fact that this specific statement is true. The method by which the prover can prove something is true can be called a "statement." The statement alone may be a simple proof. The information that is not being revealed and kept private can be called a "witness." The statement and the witness can be used together to generate the zero-knowledge proof. The statement can be analogized to a program that the prover is running, and the witness can be analogized as inputs to the program.

The zero-knowledge proof can comprise a statement output and data that proves the correctness of the statement output. The statement output can be output of the computation determining whether the statement is true or false.

For example, a prover may want to generate a zero-knowledge proof of checking whether the prover is of age to purchase alcohol. A statement, or the program, for this example can be a proof checking whether the prover is of legal age to buy alcohol. Such proof may be a simple inequality checking whether the prover is above 21. The witness can be the prover's age and may be kept private. The zero-knowledge proof for this example can prove that the prover is of legal age (above 21) to buy alcohol without revealing the prover's age. The zero-knowledge proof would comprise a statement output of "True" and data that proves that the prover is over 21 without revealing the prover's age.

In another example, a prover may want to generate a zero-knowledge proof of proving a prover's identity. A statement, or the program, for this example can be a proof checking the prover's identity information such as social security number, date of birth, address, etc. The witness can be the prover's identity information. The zero-knowledge proof for this example can prove the prover's identity without revealing the prover's identity information. The zero-knowledge proof would comprise a statement output of "True" and data that proves that the prover is indeed who it claims it to be without revealing the prover's identity information.

In yet another example, a prover may want to generate a zero-knowledge proof to show that the prover paid correct amount of tax. A statement, or the program, for this example can be a proof checking if the prover paid the correct amount of tax. The witness can be the amount of tax the prover paid. The zero-knowledge proof for this example can show that the prover paid correct amount of tax without revealing how much the prover paid. The zero-knowledge proof would comprise a statement output of "True" and data that proves that the prover paid the correct amount without revealing the prover's tax amount.

Being able to keep a witness secret provides an advantage in using the zero-knowledge proof to users who may want to keep their information private. Additionally, verifying the zero-knowledge proof can be computationally easy, which adds another advantage to using the zero-knowledge proof. However, there is a bottleneck for the zero-knowledge scheme: generating a zero-knowledge proof is computationally difficult and heavy. Due to this bottleneck, many users without advanced computing systems are unable to generate zero-knowledge schemes they want. For example, small game developers who want to create a zero-knowledge game may not have an infrastructure to have many graphical processing units (GPUs) running to generate a zero knowledge proof.

Embodiments can provide a method that can generate a zero-knowledge proof for a prover who does not have enough computation power to generate a zero-knowledge proof. The prover can transmit a proof request comprising a witness and a statement to an orchestrator that can determine an optimal zero-knowledge proof system from a list of such systems and transmit the proof request to a prover network that can generate a zero-knowledge proof in an efficient manner using the optimal zero-knowledge proof system.

FIG. 1 shows a flow diagram of a method 100 of generating a zero-knowledge proof according to some embodiments. A prover with a statement 102 and a witness 103 may want to generate a proof for the statement 102 and the witness 103. The proof can be a zero-knowledge proof comprising a statement output and data that proves the correctness of the statement output. The prover can send a request for the proof (or proof request) comprising the statement 102, the witness 103, and user-specified parameters 104. The user-specified parameters can comprise a user-specified do-not-exceed amount of memory for the proof, user-specified lowest computational requirement for verifying the proof, size limit of the zero-knowledge limit, user-specified level of minimum security, or other factors important to the prover.

The method of generating the zero-knowledge proof can comprise a preprocessing module 106, an orchestrator 108 processing a first routing module 108A and a second routing module 108B, a compilation module 110, a setup module 112, a computation module 114, and an aggregation module 116.

The preprocessing module 106 can preprocess the statement 102 and the witness 103. The preprocessing module 106 can receive the request for the proof of the statement 102 comprising the statement 102, the witness 103, and the user-specified parameters 104 from the prover. The preprocessing module 106 can work as part of the orchestrator. In some embodiments, the preprocessing module 106 can be processed by the prover before handing over control to the orchestrator. In some other embodiments, the preprocessing module 106 can be processed by a third-party computer separate from the orchestrator 108 and the prover.

Statement preprocessing can include breaking the statement 102 into different chunks that can be processed in parallel such that each chunk can be used to generate a proof chunk and proof chunks can be combined at the aggregation module 116 to determine the proof. The witness preprocessing can be keeping the witness private during the process of generating a zero-knowledge proof. Further details to the preprocessing module 106 can be shown in FIG. 2.

Upon the preprocessing module 106 preprocessing the statement 102 and the witness 103, the preprocessing module 106 can send the preprocessed statement, the preprocessed witness, and the user-specified parameter to the routing module 108A. In some embodiments, the preprocessing module 106 may not preprocess the statement 102 and the witness 103, and instead transmit the proof request directly to the routing module 108A.

The routing module 108A can be managed by the orchestrator 108. The routing module 108A, upon receiving the proof request comprising the statement 102, the witness 103, and user-specified parameters 104, can determine a selected proof system among a plurality of candidate proof systems. The routing module 108A can determine the selected proof system by determining an amount of memory required and computational requirement for a potential proof for each proof system of the plurality of candidate proof systems. The routing module 108A can then use the user-specified parameters 104 to determine the selected proof system. The amount of memory required for a potential proof can comprise an amount of memory required to generate an arithmetic circuit and an amount of memory required to generate the proof using the arithmetic circuit. The computational requirement can comprise a computational requirement to generate the arithmetic circuit and a computational requirement to generate the proof using the arithmetic circuit.

Upon determining the selected proof system, the routing module can use a first optimizing algorithm on a selected proof system to determine a first prover computer network that can optimally generate an arithmetic circuit. In some embodiments, the amount of memory required to generate the arithmetic circuit and the computational requirement to generate the arithmetic circuit can be additionally used to determine the first prover computer network. Upon determining the first prover computer network, the routing module 108A can transmit the statement 102, the witness 103, and the selected proof system to the compilation module 110. Details to the routing module 108A can further be described in FIG. 4.

In some embodiments, the user-selected parameters may comprise the user-specified proof system. In such case, the orchestrator may not need to determine the amount of memory required for the potential proof nor the computational requirement, as the selected proof system can simply be the user-specified proof system, and the first prover computer network can be selected based on the user-specified proof system using the optimizing algorithm accordingly.

The compilation module 110 can be processed by the first prover computer network determined from the routing module 108A. Upon receiving the statement 102, the witness 103, and the selected proof system from the orchestrator 108, the compilation module 110 can turn the statement 102 into the arithmetic circuit using the selected proof system. Details to the compilation module 110 can further be described in FIG. 5.

Upon determining the arithmetic circuit, the compilation module 110 can send the arithmetic circuit to the second routing module 108B or the setup module 112 depending on the selected proof system. The arithmetic circuit would be sent to the setup module 112 if the selected proof system requires a randomness (e.g., common random string) to generate the proof. Upon the setup module 114 determining the randomness and transmitting the randomness back to the compilation module 110, the compilation module 110 can transmit the witness 103, the randomness, and the arithmetic circuit to the routing module 108B. The arithmetic circuit and the witness 103 would be sent directly to the routing module 114 if the selected proof system does not require the randomness. The proof systems in the SNARK (succinct non-interactive argument of knowledge) category may typically require the randomness while the proof systems in STARK (scalable transparent argument of knowledge) category may typically not need the randomness. The method may consider this factor as to which type of proof system is ultimately selected.

The setup module 112 can be processed by the prover computer network. The setup module 112, using the arithmetic circuit, can generate the randomness required by some proof systems, such as some proof systems in SNARK category, to generate the proof. Upon determining the randomness, the setup module 112 can send the randomness back to the compilation module 110. Details to generating the randomness by the setup module 112 are further described in FIG. 6.

In some embodiments, the preprocessing module 106 and the compilation module 110 can be processed separately by the prover while the setup module 112 may be processed by a third-party independent computer such that the randomness is hidden from the prover. The prover would, in such scenario, transmit the arithmetic circuit and the witness 103 to the routing module 108B processed by the orchestrator 108. The setup module can send the randomness directly to the routing module 108B such that the prover does not know the randomness.

The routing module 108B can be processed by the orchestrator 108. The routing module 108B, upon receiving the witness 103 and the arithmetic circuit, can determine a second prover computer network that can optimally generate the proof. The routing module 108B can determine the second prover computer network by using a second optimizing algorithm on the amount of memory required to generate the proof using the arithmetic circuit, the computational requirement generate the proof using the arithmetic circuit, the witness 103, and the arithmetic circuit to determine the second prover computer network. Upon determining the second prover computer network, the routing module 108B can send the witness 103 and the arithmetic circuit to the computation module 114. In some embodiments, the routing module 108B can send the randomness (if needed) to the computation module.

The second prover computer network can be one or more computers comprising a graphics processing unit (GPU), a field-programmable gate array (FPGA), an application-specific integrated circuit (ASIC), a central processing unit (CPU), or any combination thereof.

The computation module 114 can be processed by the second prover computer network to generate the proof using the arithmetic circuit, the witness 103, and the randomness (if needed). The computation module can take the arithmetic circuit, convert the arithmetic circuit into a polynomial function that can determine a series of polynomial constraints by setting the polynomial function equal to zero, such as in Equation 1.

$$f(x)=ax^5+bx^4+cx^3+dx^2+ex+g=0 \qquad \text{Equation 1:}$$

Upon determining the series of polynomial constraints, the proof can be generated by checking through a sample of a few points on the polynomial. If the prover samples a point and the prover knows that the degree and the point matches, the probability that the prover got that actual exact same polynomial, or the witness, the whole way through is high. Typically, the polynomials can be checked only in one spot, but multiple spots can be checked for higher security and verification. Such polynomial computation can involve generating homomorphic encodings through using elliptic curve cryptography. Using the polynomial constraints, the proof comprising the statement output and the data that proves the correctness of the statement output can be determined.

Upon determining the proof, the second prover network computer processing the computation module 114 can send the proof back to the orchestrator. The orchestrator, upon receiving the proof, can make the proof available to the prover such as a client computer. The orchestrator can make the proof available to the prover via a blockchain by storing the statement and the proof in the block chain. Additionally, by storing the statement and the proof in the block chain, other verifiers of the proof may be able to verify the proof using the blockchain In some embodiments, if the statement 102 is broken into different chunks from the preprocessing module 106, the computation module 114 can determine a proof chunk for each chunk of the statement 102. The prover computer network can then send proof chunks to the aggregation module 116 such that the proof chunks can be aggregated into the proof During the aggregation, the aggregation module 116 may use the computation module 114 to aggregate proof chunks into the proof.

Figure 2:
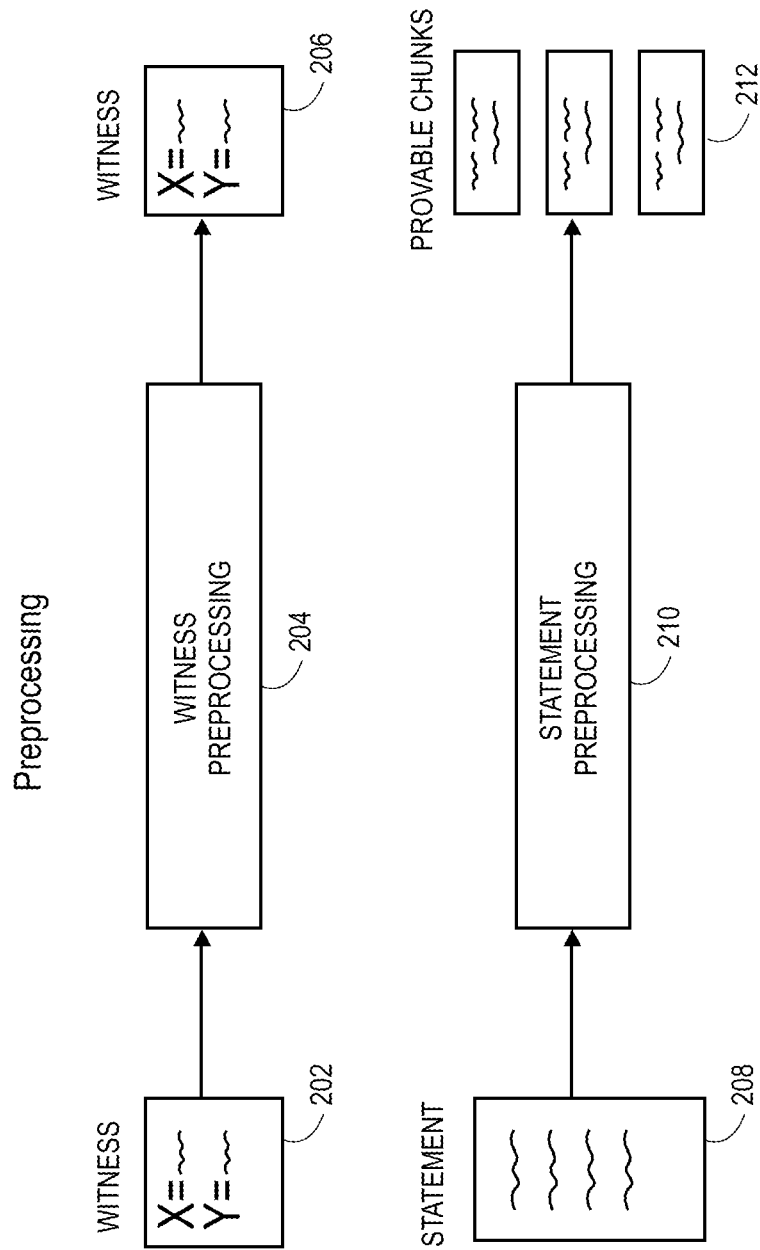
FIG. 2 shows a flow diagram of a preprocessing phase according to some embodiments.

FIG. 2 shows a flow diagram of a preprocessing module according to some embodiments. A witness 202 can be preprocessed using a witness preprocessing 204 to determine a preprocessed witness 206. A statement 208 can be preprocessed using a statement preprocessing 210 to determine a preprocessed statement 212.

The witness preprocessing 204 can keep the witness 202 private during the process of generating a proof. To keep the witness private, but still enable computation of the proof, the witness preprocessing 204 can perform a fully homomorphic encryption to the witness 202 to determine an encrypted witness 206. The fully homomorphic encryption can encrypt the witness 202 in such a way where the encrypted witness can still be used to perform computations as opposed to normal encryption. The encryption allows the witness 202 to be kept private. The encrypted witness can be used as the preprocessed statement 212.

Another way to determine the preprocessed witness 206 is by performing secret sharing. The witness preprocessing 204 can divide the witness 202 into different shares, and each share can be given to the orchestrator separately. Each share can be used to generate a proof share, and proof shares can be aggregated to generate the proof for the witness. The shares of the witness 202 can be used as the preprocessed witness 204.

The statement preprocessing 210 can first determine whether the statement 208 can be preprocessed by checking whether the statement 208 can be divided into different chunks that can be processed in parallel. Upon determining that the statement 208 can be divided into different chunks, the statement preprocessing 210 can break the statement 208 into different statement chunks that can be processed in parallel such that each chunk can be used to generate different proofs chunks. These proofs chunks can then later be aggregated to determine a proof that proves the statement 208 in aggregation module of FIG. 7. The statement chunks can be preprocessed statement 212.

Figure 3:
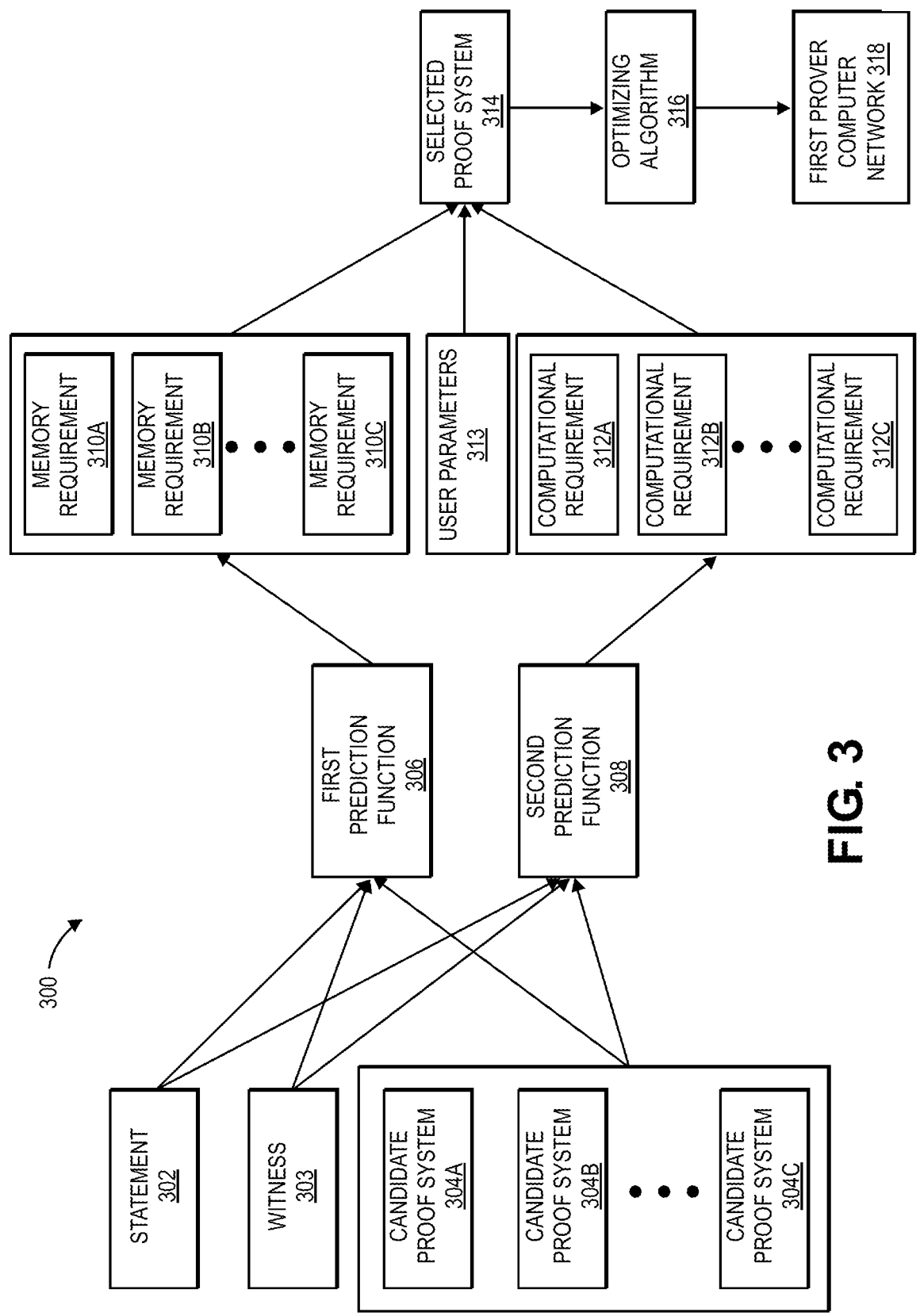
FIG. 3 shows a flow diagram of a routing phase according to some embodiments.

FIG. 3 shows a diagram of a routing module according to some embodiments. The routing module, upon receiving a proof request comprising a statement 302, a witness 303, and user-specified parameters 313, can determine a selected proof system 314 among a plurality of candidate proof systems 304A, 304B, 304C, etc.

The routing module can determine the selected proof system 314 by determining amount of memory 310 required for a potential proof (i.e., memory requirement) and computational requirement 312A, 312B, 312C, etc. for each proof system of the plurality of candidate proof systems. The amount of memory 310 required for the potential proof can be amount of memory required to generate the proof. The computational requirement can be complexity of the proof generation (e.g., number of matrix multiplication, operations, etc. to generate the proof). The amount of memory 310 required to generate a potential proof can comprise an amount of memory required to generate an arithmetic circuit and an amount of memory required to generate the proof using the arithmetic circuit. The computational requirement 312 can comprise a computational requirement to generate the arithmetic circuit and a computational requirement to generate the proof using the arithmetic circuit.

The routing module can then use the user-specified parameters 313 to determine the selected proof system 314. Upon determining the selected proof system 314, the routing module can use an optimizing algorithm 316 on the selected proof system 314 to determine a first prover computer network 318 that can optimally generate the arithmetic circuit.

The routing module can comprise a plurality of candidate proof systems 304 that can be used to generate a zero-knowledge proof. The candidate proof systems can be of a zero succinct non-interactive argument of knowledge (SNARK) category and a scalable transparent argument of knowledge (STARK) category. The SNARK category can include a rank-1 constraint system (R1CS) proof system and Lagrange-bases for oecumenical noninteractive arguments of knowledge (PLONK) proof system. The STARK category can comprise of an arithmetic intermediate representation (AIR) proof system.

Different categories of the proof systems can have different properties. Proof systems in the SNARK category can be more efficient to verify (i.e., have a lower computational requirement) but be harder to generate the proof, while proof systems in STARK category can be less efficient to verify (i.e., have a higher computational requirement) but be easier to generate the proof Additionally, the proof systems in SNARK category may need a trusted setup while the proof systems in STARK category may not need a trusted setup.

The proof systems in STARK category may be used for computing repetitive and parallel tasks including recursive functions. For example, if the routing module ascertains from the statement 302 and the witness 303 that generating the proof would require computing repetitive and parallel tasks including recursion, the routing module can use the proof systems in the STARK category to generate the proof. The proof systems in the SNARK category may be used for computing sequential and different tasks. For example, if the routing module ascertains from the statement 302 and the witness 303 that generating the potential proof would require computing sequential and different tasks, the routing module can use the proof systems in the SNARK category to generate the proof.

Different proving systems can have different proof sizes. For example, Groth 16 proof system of the SNARK category can generate proofs of a constant size while proof systems of the STARK category can generate proofs that are proportional to the size of the statement in the proof request.

The routing module can analyze the statement 302 and the witness 303 of the proof request to determine an amount of memory required for a potential proof for each proof system of a plurality of candidate proof systems. The amount of memory required for a potential proof can comprise an amount of memory required to generate an arithmetic circuit and an amount of memory required to generate the proof using the arithmetic circuit. The amount of memory required for the potential proof can be determined by inputting the statement 302, the witness 303, and an attribute for each proof system 304 into a first predictive function 306. The first predictive function 306 can be a machine learning model developed using supervised learning, or other data science techniques or prediction techniques. The supervised learning can train the machine learning model by using previous data. The previous data can comprise memory requirements for potential proofs given statements, witnesses, and attributes for different proof systems. The trained machine learning model can then be used to accurately predict the amount of memory 310A, 310B, 310C, etc. required for the potential proof based on the statement 302, the witness 303, and the attribute of each proof system 304A-C of the candidate proof systems. In some embodiments, the first predictive function 306 can be used to predict the amount of memory required to generate an arithmetic circuit and the amount of memory required to generate the proof using the arithmetic circuit individually.

As an illustrative example, the statement 302, the witness 303, and an attribute of a candidate proof system 304A can be inputted into the first prediction function 306 to determine a memory requirement 310A. In another example, the statement 302, the witness 303, and an attribute of a candidate proof system 304B can be inputted into the first prediction function 306 to determine a memory requirement 310B.

The routing module can evaluate the statement 302 and the witness 303 of the proof request to determine a computational requirement for the potential proof for each proof system of the plurality of candidate proof systems. The computational requirement 312 can comprise a computational requirement to generate the arithmetic circuit and a computational requirement to generate the proof using the arithmetic circuit. The computational requirement can be determined by inputting the statement 302, the witness 303, and an attribute for each proof system 304A-C into a second predictive function 308. Similar to determining the amount of memory required, the second predictive function 308 can be a machine learning model developed using supervised learning, or other data science techniques or prediction techniques. The supervised learning can train the machine learning model by using previous data. The previous data can comprise computational requirements for potential proofs given statements, witnesses, and attributes for different proof systems. The trained machine learning model can then be used to accurately predict the computational requirement 312 for the potential proof based on the statement 302, the witness 303, and the attribute 304A, 304B, or 304C of each proof system of the candidate proof systems. In some embodiments, the second predictive function 306 can be used to predict the computational requirement to generate an arithmetic circuit and the computational requirement to generate the proof using the arithmetic circuit individually.

As an illustrative example, the statement 302, the witness 303, and an attribute of a candidate proof system 304A can be inputted into the second prediction function 308 to determine a computational requirement 312A. In another example, the statement 302, the witness 303, and an attribute of a candidate proof system 304B can be inputted into the second prediction function 308 to determine a computational requirement 312B.

The routing module, upon determining the amount of memory required for the potential proof 310A, 310B, or 310C and the computational requirement 312A, 312B, or 312C for the potential proof for each proof system of the plurality of candidate proof systems, can select a selected proof system 314 from the candidate proof systems based on the user-specified parameters 313, the memory requirements of the candidate proof systems 310A, 310B, or 310C, and the computational requirements 312A, 312B, or 312C of the candidate proof systems. Details to how the user-specified parameter can be used to select the selected proof system are described in FIG. 4.

There can be a tradeoff between the amount of computation in generating the proof and the size of the proof. When more computation is performed in generating the potential proof, the smaller sized proof can be generated along with a faster verification time of the proof. When less computation power is performed in generating the same potential proof, the larger sized proof can be generated along with slower verification time of the proof. These may be taken into consideration by the prover when selected the selected proof system as, for example, larger proof size may not be favorable in cases where the prover wants to add the proof to a blockchain. This may lead the prover to select higher user-specified lowest computational requirement in its user-specified parameter.

Upon determining the selected proof system, the routing module can choose the first prover computer network 318 to run the selected proof system 314 on the statement 302 and the witness 303 to generate the arithmetic circuit. The first prover computer network can be one or more computers comprising a graphics processing unit (GPU), a field-programmable gate array (FPGA), an application-specific integrated circuit (ASIC), a central processing unit (CPU), or any combination thereof.

The routing module can choose the first prover computer network 318 by using the a first optimizing algorithm 316. The first optimizing algorithm 316 can determine the first prover computer network that is most optimal to generate the arithmetic circuit. For example, proofing systems in the SNARK category can run faster on GPUs because they have a lot of a certain matrix multiplication operations that are repetitive and can be computed parallelly. Meanwhile, proofing systems in the STARK category can have a lot of fast Fourier transforms that are sequential and different, which make it better for FPGAs and CPUs.

In some embodiments, the routing module can use the computational requirement to generate the arithmetic circuit, the amount of memory required to generate the arithmetic circuit, and the selected proof system on the optimizing algorithm to determine the first prover computer network 318.

In addition to the proof system, the optimizing algorithm 316 may consider other constraints. For example, the routing module can detect an amount of load that potential first prover computer networks are handling currently and selecting the prover computer network among the potential prover computer networks based on the detecting.

Figure 4:
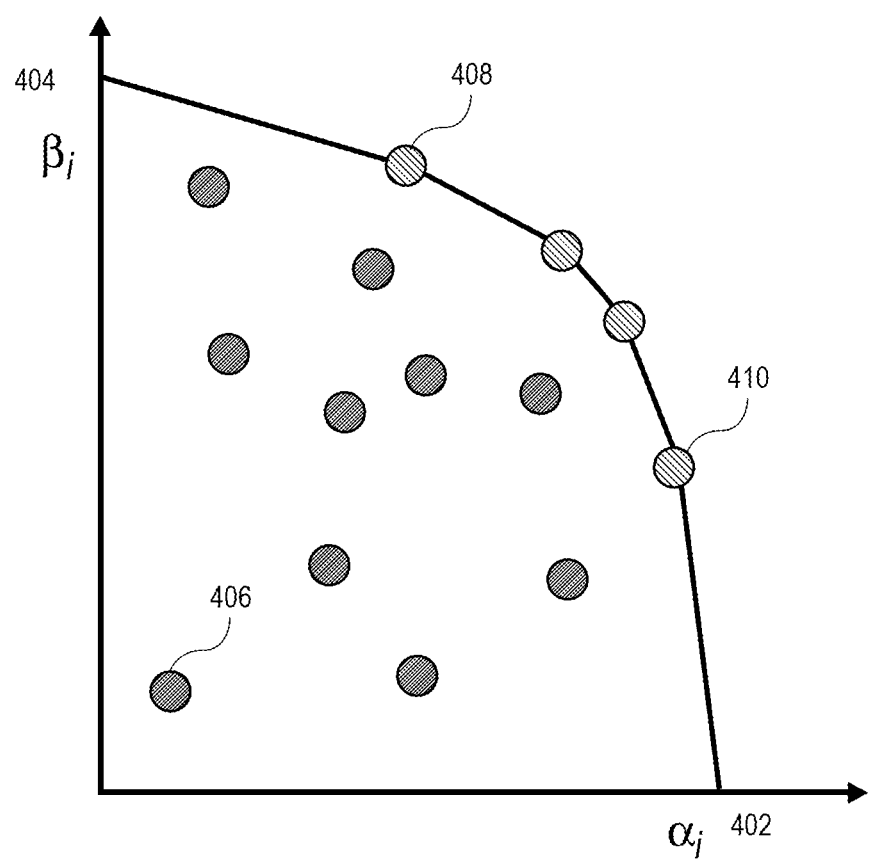
FIG. 4 shows an illustration of choosing a proof system according to some embodiments.

FIG. 4 shows an illustration of choosing a proof system according to some embodiments by a routing module. A graph in FIG. 4 can comprise x-axis representing alpha 402 and y-axis representing beta 404. The alpha can be the amount of memory required to generate the potential proof. The beta can be the computational requirement for the potential proof (i.e., the amount of verification time). Different nodes can represent different proving system in accordance with the matching alpha and beta given a statement and a witness.

The routing module can determine which node, or proving system, to choose based on the user-specified parameters. The nodes shown in the figure can be nodes that fall under the restrictions of the user-specified parameters. For example, the user-specified parameters can be the user-specified do-not-exceed amount of memory for the proof (alpha) and the user-specified computation requirement for the proof (beta). The node 408 can represent the proofing system with the highest computation requirement that is under the user-specified computation requirement. The node 408 can represent the proofing system with the highest amount of memory that is under the user-specified do-not-exceed amount of memory.

If there are multiple proving systems that fall under the user-specified parameters, the routing module can choose a node that may require the least amount of computation or memory to save its computation and memory power for other zero knowledge proofs. For this illustration, the node 406, or the proving system, occupying smallest memory requirement and lowest computational requirement may be chosen to be used to generate the proof.

Figure 5:
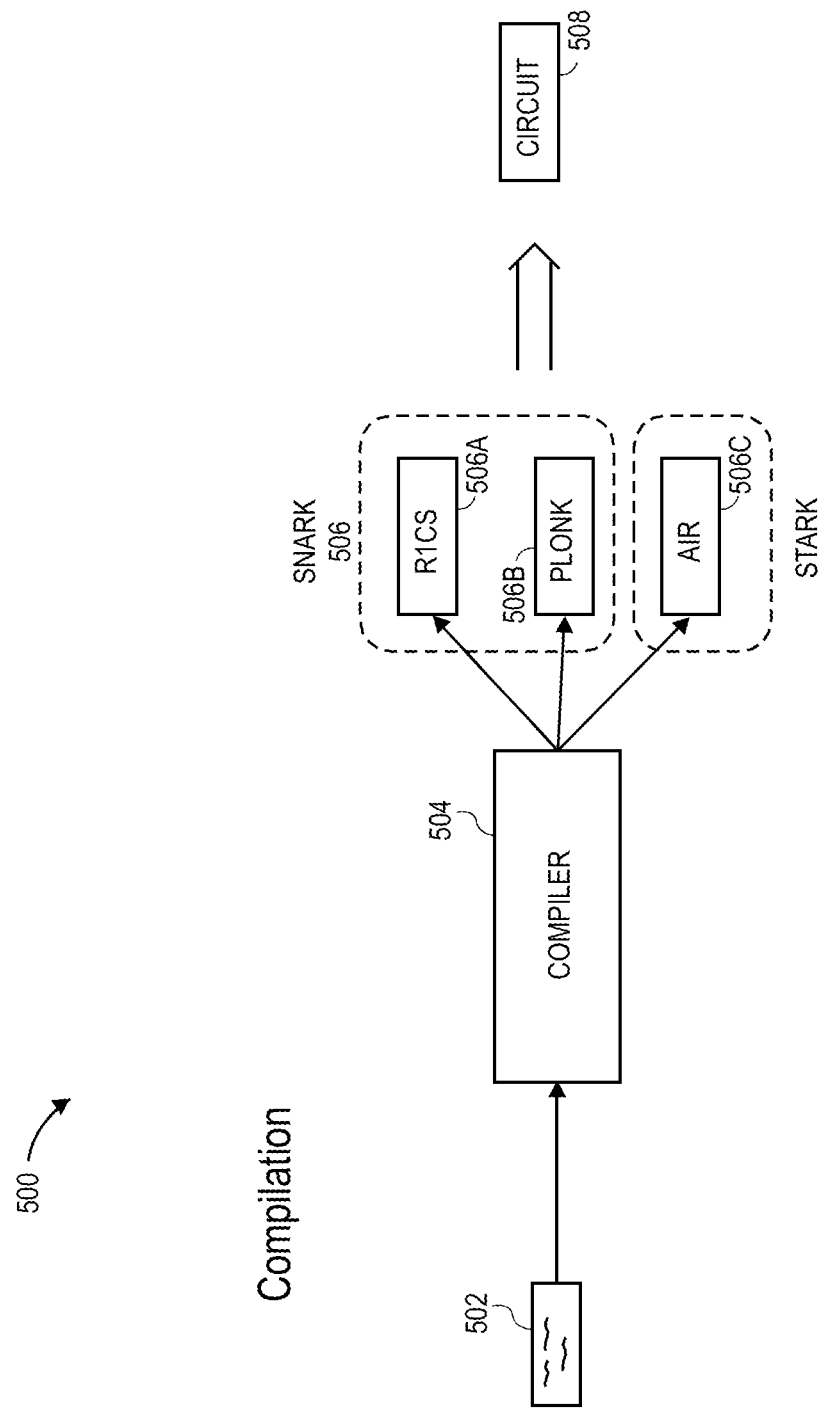
FIG. 5 shows a flow diagram of a compilation phase according to some embodiments.

FIG. 5 shows a flow diagram of a compilation module according to some embodiments. A statement 502 can be inputted into a compiler 504 that can generate an arithmetic circuit 508. The compilation module can use a selective proof system to determine the arithmetic circuit 508. The selective proof system can include R1CS 506A and Plonk 506B in SNARK category and AIR 506C in STARK category.

The compiler 504 can turn the statement 502, which may be written in a high level programming language such as Solidity or WASM (WebAssembly), into the arithmetic circuit. The arithmetic circuit can be a series of gates in hardware such as AND gates, OR gates, NAND gates, etc. Each gate can be a mathematical operation such as plus or multiply. The arithmetic circuit may be a representation of the statement such that it is easier to turn it into a polynomial later.

Different proof system can output different arithmetic circuit. For example, an arithmetic circuit for RICS proof system may be different than PLONK proof system. The arithmetic circuit 508 can be the arithmetic circuit of the selected proof system received from the routing module in FIG. 2.

Figure 6:
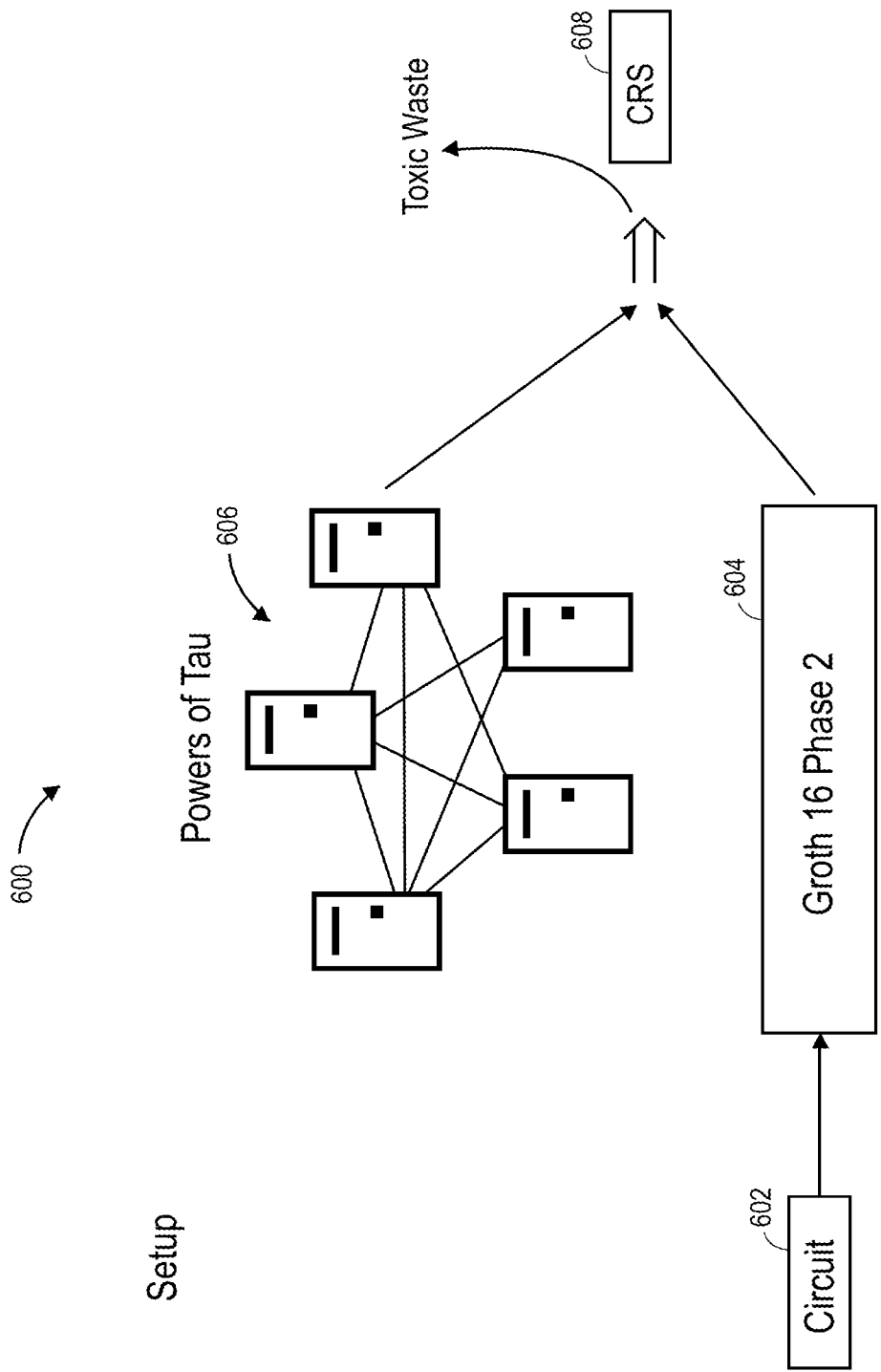
FIG. 6 shows a flow diagram of a setup phase according to some embodiments.

FIG. 6 shows a diagram of a setup module according to some embodiments. The setup module, upon receiving an arithmetic circuit 602, can determine a randomness specific to the arithmetic circuit 602 (e.g., common reference string CRS) 608 using a multi-party computation involving multiple parties (e.g., computers) 606 and a proof system 604. The multiple parties 606 can be computers not used to generate the proof within the prover computer network or can be computers from a trusted third party.

In the multi-party computation (MPC), each party of the multiple parties 606 can contribute a randomly sampled input to generate a random value. All parties can jointly compute the random value while keeping their randomly sampled inputs private by using a certain function over their private inputs such that no one party can determine the random value. There can be several schemes of generating the random value using the multi-party computation including the Powers of Tau method.

By using the multi-party computation (MPC), the setup module can create the random value that is secure. Multi-party computation allows the random value to be secure even if there is only one party in the MPC that is not corrupted. Additionally, the setup module can keep the random value inaccessible and private from the prover and the verifier.

Certain proof systems may require the randomness 608 when generating the proof. Examples of such proof systems can include Groth 16, which is in SNARK category. If the selected proof system is Groth 16, the compilation module can use the Groth 16 phase 1 to generate the arithmetic circuit 602. Upon generating the arithmetic circuit 602, the setup module can use the Groth 16 phase 2 604 and the random value generated by the MPC to determine the randomness 608 specific to the arithmetic circuit 602.

Figure 7:
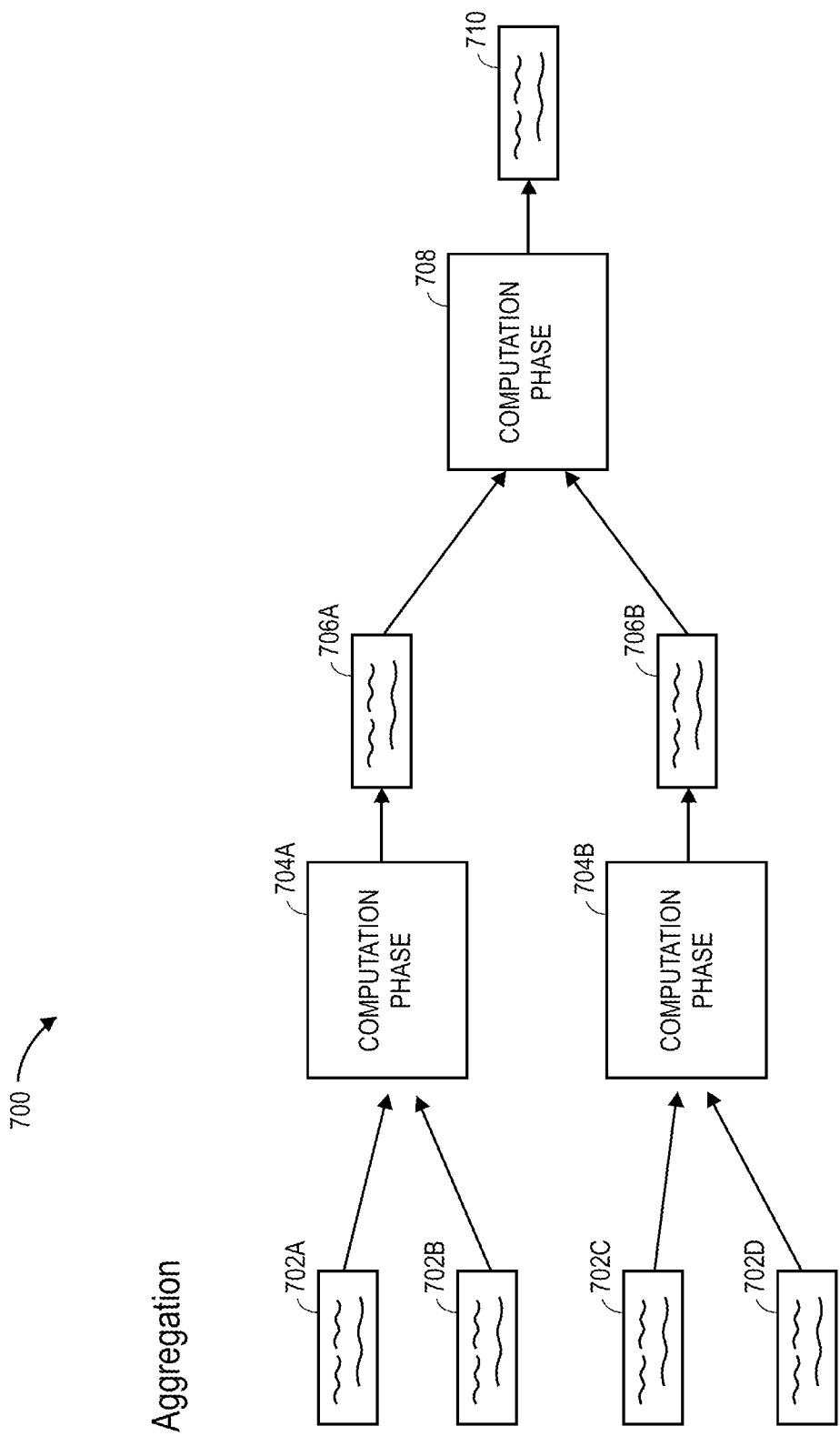
FIG. 7 shows a flow diagram of an aggregation phase according to some embodiments.

FIG. 7 shows a flow diagram of an aggregation phase according to some embodiments. Each chunk of a statement can determine a proof chunk. In the figure, four proof chunks (702A, 702B, 702C, 702D) are shown. The computation phases (704A, 704B, and 708) can be computation phase described in computation 114 of FIG. 1.

In the aggregation phase, a proof chunk 702A and a proof chunk 702B can be combined in computation phase 704A to determine an intermediary proof chunk 706A. Likewise, a proof chunk 702C and a proof chunk 702D can be combined in the computation phase 704B to determine an intermediary proof chunk 706B.

Upon determining the intermediary proof chunk 706A and the intermediary proof chunk 706B, the two intermediary proof chunks can be combined in the computation phase 708 to determine a proof 710.

In some embodiments, the proof chunks may be recursive parts of the proof 710. For example, executing the proof 710 may lead to execution of the intermediary proof chunk 706A and the intermediary proof chunk 706B, which may trigger the execution of proof chunks 702A, 702B, 702C, and 702D. Therefore, when aggregating the proof chunks, the computation phase can assemble the proof chunks in such a way where the proof chunks 702A-702D are part of the proof 710 and executing the proof 710 can trigger the execution of the proof chunks 702A-702D.

Figure 8:
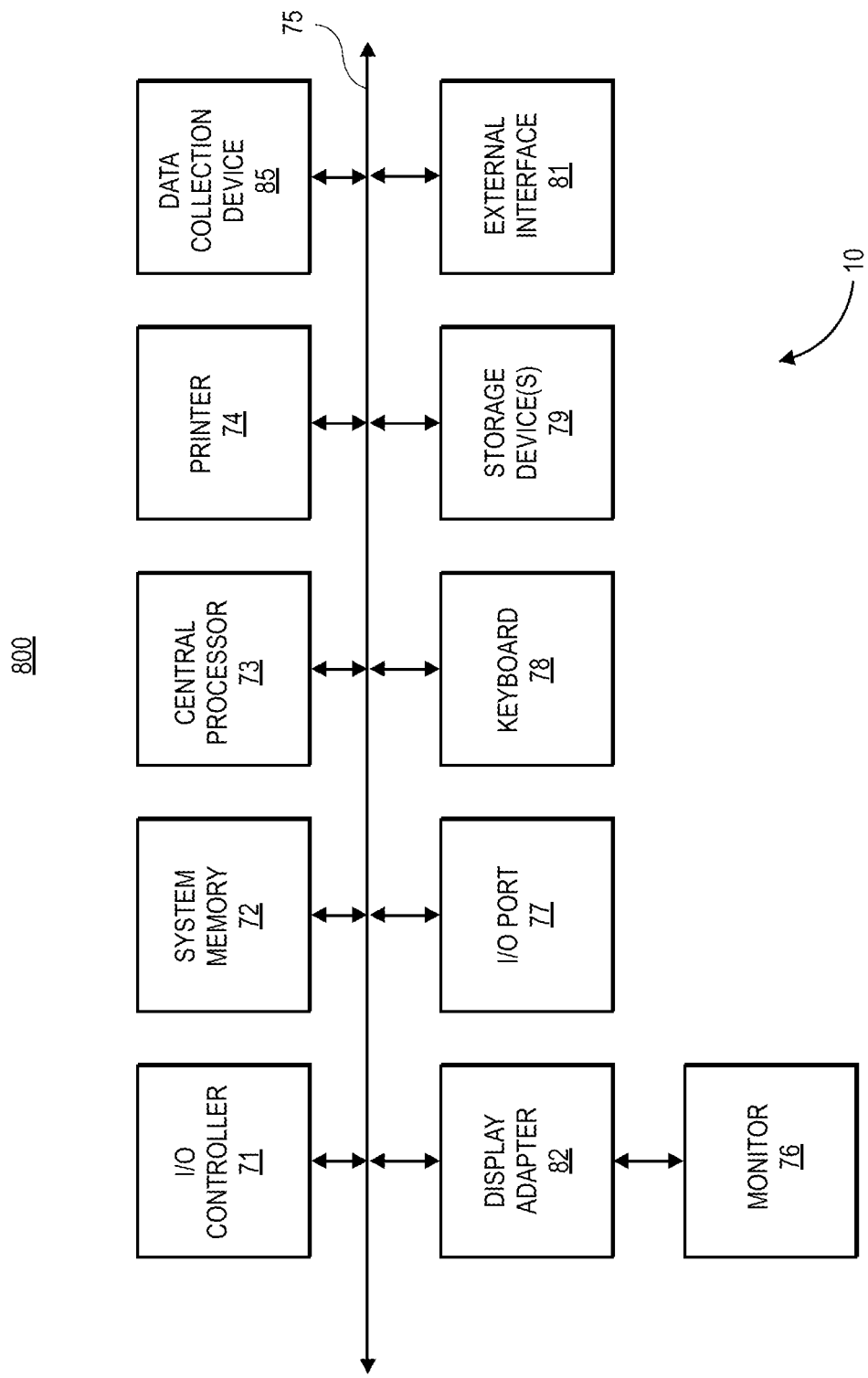
FIG. 8 shows a block diagram of an example computer system usable with systems and methods according to embodiments of the present invention.

FIG. 8 illustrates an example computer system 10 for computations. It may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in the figure are interconnected via a system bus 75. Additional subsystems such as a printer 74, keyboard 78, storage device(s) 79, monitor 76 (e.g., a display screen, such as an LED (light emitting diode) screen), which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire©). For example, I/O port 77 or external interface 81 (e.g., Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Figure 9:
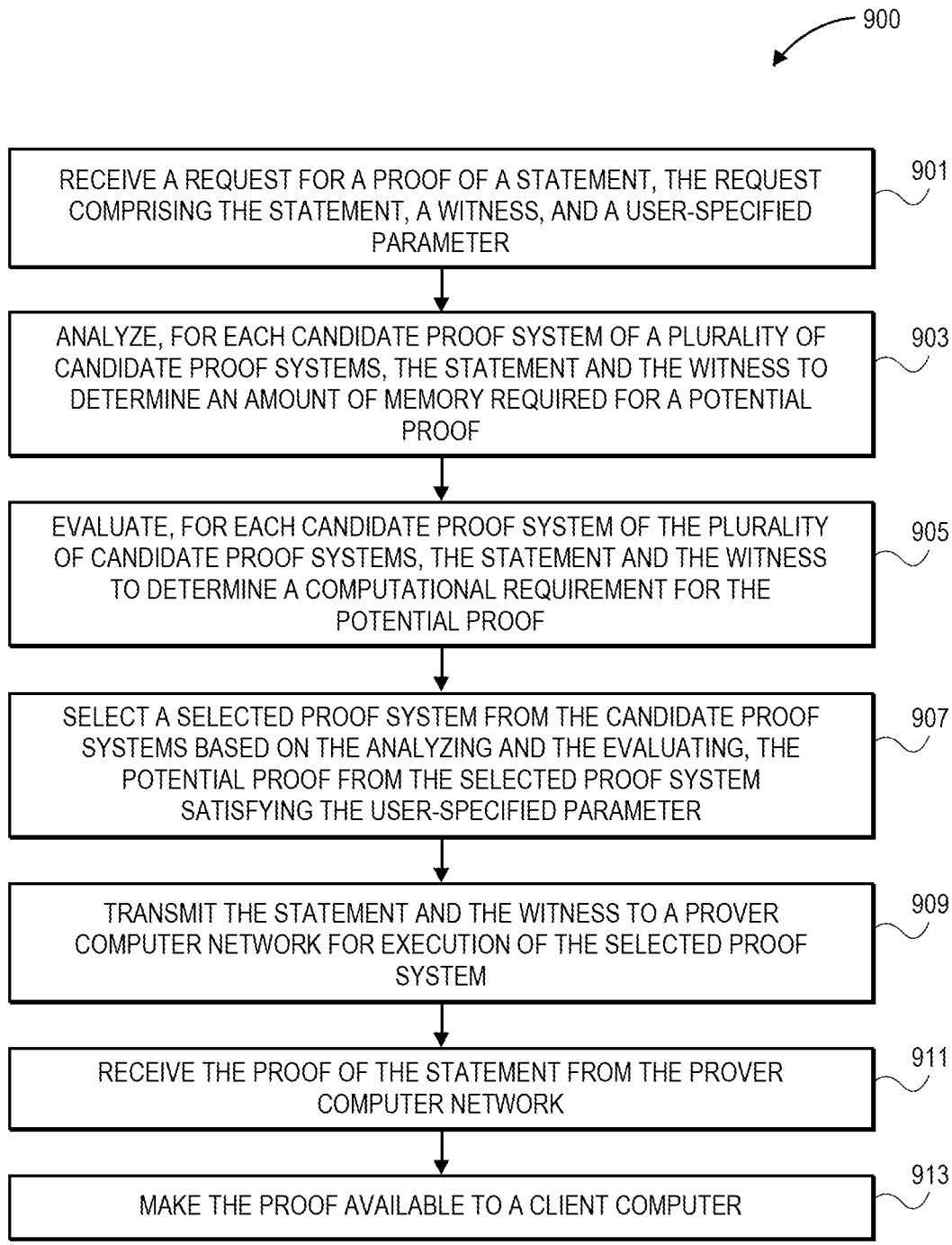
FIG. 9 is a flowchart illustrating a process in accordance with an embodiment.

FIG. 9 is a flowchart of process 900 in accordance with an embodiment. In operation 901, a request for a proof of a statement is received, the request comprising the statement, a witness, and a user-specified parameter. In operation 903, the statement and the witness are analyzed, for each candidate proof system of a plurality of candidate proof systems, in order to determine an amount of memory required for a potential proof from the respective candidate proof system. In operation 905, the statement and the witness are evaluated, for each candidate proof system of the plurality of candidate proof systems, in order to determine a computational requirement for the potential proof, given the respective candidate proof system. In operation 907, a selected proof system is selected from the candidate proof systems based on the analyzing and the evaluating, the potential proof from the selected proof system satisfying the user-specified parameter. In operation 909, the statement and the witness are transmitted to a prover computer network that hosts the execution of the selected proof system. In operation 911, the proof of the statement is received from the prover computer network. In operation 913, the proof is made available to a client computer. The client computer is not necessarily the requesting computer.

Aspects of embodiments can be implemented in the form of control logic using hardware circuitry (e.g., an application specific integrated circuit or field programmable gate array) and/or using computer software stored in a memory with a generally programmable processor in a modular or integrated manner, and thus a processor can include memory storing software instructions that configure hardware circuitry, as well as an FPGA with configuration instructions or an ASIC. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Any operations performed with a processor may be performed in real-time. The term "real-time" may refer to computing operations or processes that are completed within a certain time constraint. The time constraint may be 1 minute, 1 hour, 1 day, or 7 days. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

The claims may be drafted to exclude any element which may be optional. As such, this statement is intended to serve as antecedent basis for use of such exclusive terminology as "solely", "only", and the like in connection with the recitation of claim elements, or the use of a "negative" limitation.

All patents, patent applications, publications, and descriptions mentioned herein are incorporated by reference in their entirety for all purposes. None is admitted to be prior art. Where a conflict exists between the instant application and a reference provided herein, the instant application shall dominate.

What is claimed is:

1. A method of generating a zero-knowledge proof, the method comprising:
    receiving a request for a proof of a statement, the request comprising the statement, a witness, and a user-specified parameter;
    analyzing, for each candidate proof system of a plurality of candidate proof systems, the statement and the witness to determine an amount of memory required for a potential proof,
    evaluating, for each candidate proof system of the plurality of candidate proof systems, the statement and the witness to determine a computational requirement for the potential proof,
    selecting a selected proof system from the candidate proof systems based on the analyzing and the evaluating, the potential proof from the selected proof system satisfying the user-specified parameter;
    transmitting the statement and the witness to a prover computer network for execution of the selected proof system;
    receiving the proof of the statement; and
    making the proof available to a client computer.

2. The method of claim 1, wherein the candidate proof systems include a zero succinct non-interactive argument of knowledge (SNARK) proof system and a scalable transparent argument of knowledge (STARK) proof system.

3. The method of claim 2, further comprising:
    ascertaining from the statement and the witness that generating the potential proof in any proof system of the candidate proof systems would require computing sequential and different tasks,
    wherein the selected proof system is the SNARK proof system.

4. The method of claim 2, wherein the SNARK proof systems include a rank-1 constraint system (R1CS) proof system and a permutations over Lagrange-bases for oecumenical noninteractive arguments of knowledge (PLONK) proof system.

5. The method of claim 2, further comprising:
    ascertaining from the statement and the witness that generating the potential proof in any proof system of the candidate proof systems would require computing repetitive and parallel tasks including recursion,
    wherein the selected proof system is the STARK proof system.

6. The method of claim 2, wherein the STARK proof system employs an arithmetic intermediate representation (AIR) step.

7. The method of claim 1, wherein the user-specified parameter includes a user-specified do-not-exceed amount of memory for the proof.

8. The method of claim 1, wherein the user-specified parameter includes a user specified lowest computational requirement.

9. The method of claim 1, wherein the amount of memory required for the proof for each candidate proof system is determined by inputting the statement, the witness, and an attribute for each proof system into a first predictive function.

10. The method of claim 1, further comprising:
    detecting an amount of load that candidate prover computer networks are handling; and
    selecting the prover computer network from among the candidate prover computer networks based on the detecting.

11. The method of claim 1, wherein the prover computer network comprises a graphics processing unit (GPU), a field-programmable gate array (FPGA), an application-specific integrated circuit (ASIC), a central processing unit (CPU), or any combination thereof.

12. The method of claim 1, further comprising:
    encrypting the witness through a homomorphic encryption.

13. The method of claim 1, further comprising:
    determining that the statement can be broken into chunks that can be processed in parallel; and
    dividing the statement into the chunks before the transmitting.

14. The method of claim 1, further comprising:
    converting, by the prover computer network, the statement into an arithmetic circuit.

15. The method of claim 14, further comprising:
    sending, by the prover computer network, the arithmetic circuit to a trusted setup, wherein the trusted setup generates a randomness.

16. The method of claim 1, wherein making the proof available includes storing the statement and the proof in a blockchain, in a decentralized storage network, or on a centralized cloud storage.

17. A non-transitory computer-readable medium for generating a zero-knowledge proof, the medium comprising instructions stored thereon, that when executed on a processor, perform operations comprising:
    receiving a request for a proof of a statement, the request comprising the statement, a witness, and a user-specified parameter;

analyzing, for each candidate proof system of a plurality of candidate proof systems, the statement and the witness to determine an amount of memory required for a potential proof, evaluating, for each candidate proof system of the plurality of candidate proof systems, the statement and the witness to determine a computational requirement for the potential proof, selecting a selected proof system from the candidate proof systems based on the analyzing and the evaluating, the potential proof from the selected proof system satisfying the user-specified parameter;

transmitting the statement and the witness to a prover computer network for execution of the selected proof system;

receiving the proof of the statement; and making the proof available to a client computer.

18. The medium of claim 17, wherein the candidate proof systems include a zero succinct non-interactive argument of knowledge (SNARK) proof system and a scalable transparent argument of knowledge (STARK) proof system.

19. A system for generating a zero-knowledge proof, the system comprising:

one or more processors; and a memory storing instructions that, when executed by the one or more processors, cause the one or more processors to perform operations comprising:

receiving a request for a proof of a statement, the request comprising the statement, a witness, and a user-specified parameter;

analyzing, for each candidate proof system of a plurality of candidate proof systems, the statement and the witness to determine an amount of memory required for a potential proof, evaluating, for each candidate proof system of the plurality of candidate proof systems, the statement and the witness to determine a computational requirement for the potential proof, selecting a selected proof system from the candidate proof systems based on the analyzing and the evaluating, the potential proof from the selected proof system satisfying the user-specified parameter;

transmitting the statement and the witness to a prover computer network for execution of the selected proof system;

receiving the proof of the statement; and making the proof available to a client computer.

20. The system of claim 19, wherein the candidate proof systems include a zero succinct non-interactive argument of knowledge (SNARK) proof system and a scalable transparent argument of knowledge (STARK) proof system.

* * * * *